United States Patent
Huang et al.

(10) Patent No.: US 9,952,880 B2
(45) Date of Patent: Apr. 24, 2018

(54) WAKE UP SYSTEM FOR ELECTRONIC DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Tong-Qi Huang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 690 days.

(21) Appl. No.: 14/587,228

(22) Filed: Dec. 31, 2014

(65) Prior Publication Data

US 2016/0132341 A1 May 12, 2016

(30) Foreign Application Priority Data

Nov. 10, 2014 (CN) .......................... 2014 1 0625054

(51) Int. Cl.
| | | |
|---|---|---|
| G06F 9/00 | (2006.01) | |
| G06F 9/24 | (2006.01) | |
| G06F 15/177 | (2006.01) | |
| G06F 9/44 | (2018.01) | |
| G06F 1/32 | (2006.01) | |
| G06F 13/40 | (2006.01) | |

(52) U.S. Cl.
CPC .......... *G06F 9/4418* (2013.01); *G06F 1/3243* (2013.01); *G06F 1/3287* (2013.01); *G06F 13/4022* (2013.01)

(58) Field of Classification Search
CPC ..................................................... G06F 9/4418
See application file for complete search history.

(56) References Cited

U.S. PATENT DOCUMENTS

| 6,278,302 B1* | 8/2001 | El-Kik | H03K 17/22 |
| | | | 327/143 |
| 8,900,766 B2* | 12/2014 | Rogahn | H01M 8/04223 |
| | | | 180/65.1 |
| 2005/0178135 A1* | 8/2005 | Schanin | F25D 29/00 |
| | | | 62/228.1 |
| 2006/0164136 A1* | 7/2006 | Shin | H03K 17/223 |
| | | | 327/143 |
| 2007/0103820 A1* | 5/2007 | Kobayashi | H02H 6/005 |
| | | | 361/25 |

* cited by examiner

*Primary Examiner* — Mohammed Rehman
(74) *Attorney, Agent, or Firm* — ScienBiziP, P.C.

(57) ABSTRACT

A wake up system for electronic device includes a detecting circuit, an amplifier circuit, a switch circuit, and a south bridge chip. The detecting circuit detects an ambient temperature change as a result of the physical proximity of a user, converts the temperature change to a weak voltage signal, and amplifies the voltage signal for the first time. The amplifier circuit receives the amplified voltage signal and amplifies the voltage signal for the second time. The switch circuit receives the voltage signal that is amplified for the second time, and outputs a wake up signal when the voltage signal amplified for the second time is greater than a turn-on voltage. The south bridge chip receives the wake up signal, and wakes up the electronic device accordingly.

16 Claims, 2 Drawing Sheets

WAKE UP SYSTEM FOR ELECTRONIC DEVICE

CROSS-REFERENCE TO RELATED APPLICATIONS

This application claims priority to Chinese Patent Application No. 201410625054.7 filed on Nov. 10, 2014, the contents of which are incorporated by reference herein.

FIELD

The subject matter herein generally relates to power-saving techniques in electronic devices.

BACKGROUND

Conventional personal computers usually go into a sleep mode when the computer is not used for a period of time. Users need to wake up the computer using the mouse or the keyboard.

BRIEF DESCRIPTION OF THE DRAWINGS

Implementations of the present technology will now be described, by way of example only, with reference to the attached figures.

DETAILED DESCRIPTION

Figure 1:
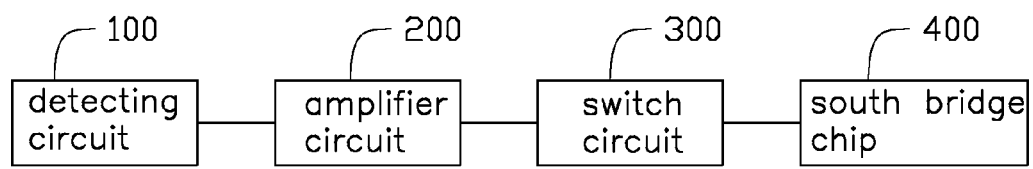
FIG. 1 is a block diagram of an embodiment of a wake up system for electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a wake up system for electronic device in accordance with an embodiment. The wake up system includes a detecting circuit 100, an amplifier circuit 200, a switch circuit 300, and a south bridge chip 400.

Figure 2:
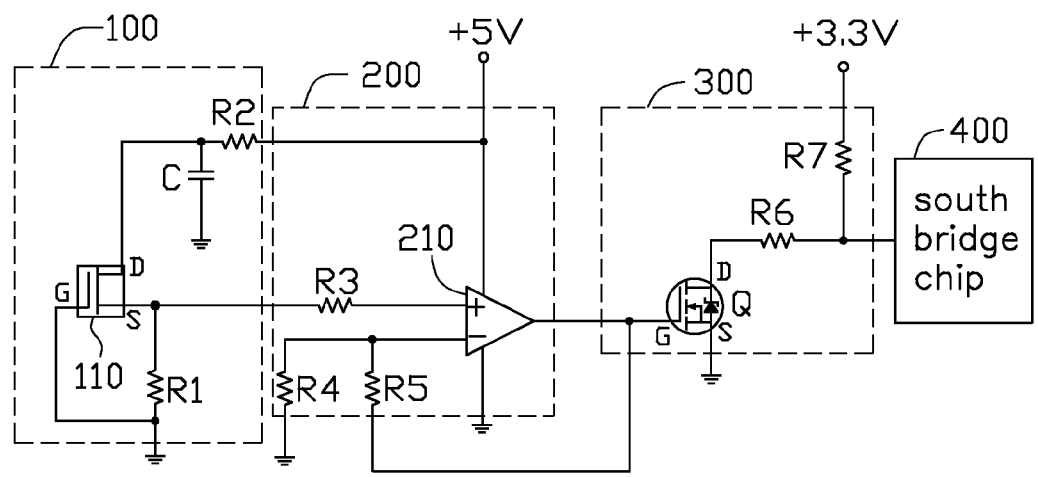
FIG. 2 is a circuit diagram of the wake up system for electronic device of FIG. 1.

FIG. 2 illustrates that the detecting circuit 100 includes a detector 110, a first resistor R1, a second resistor R2, and a capacitor C. The detector 110 includes a gate, a source, and a drain. The gate of the detector 110 is grounded. The source of the detector 110 is grounded via the first resistor R1. The drain of the detector 110 receives a first DC voltage via the second resistor R2. The drain of the detector 110 is grounded via the capacitor C. In one embodiment, the detector 110 is a heat detector. The first DC voltage is +5 volts.

The amplifier circuit 200 includes an amplifier 210, a third resistor R3, a fourth resistor R4, and a fifth resistor R5. The amplifier 210 includes an inverting input terminal, a non-inverting input terminal, an output terminal, and a power terminal. The non-inverting input terminal of the amplifier 210 is electrically coupled to the source of the detector 110 via the third resistor R3. The inverting input terminal of the amplifier 210 is grounded via the fourth resistor R4. The inverting input terminal of the amplifier 210 is electrically coupled to the output terminal of the amplifier 210 via the fifth resistor R5. The power terminal of the amplifier 210 receives the first DC voltage.

The switch circuit 300 includes a MOSFET Q, a sixth resistor R6, and a seventh resistor R7. The MOSFET Q includes a gate, a source, and a drain. The gate of the MOSFET Q is electrically coupled to the output terminal of the amplifier 210. The source of the MOSFET Q is grounded. The drain of the MOSFET Q is electrically coupled to a wake up terminal of the south bridge chip 400 via the sixth resistor R6. The wake up terminal of the south bridge chip 400 receives a second DC voltage via the seventh resistor R7. In one embodiment, the MOSFET Q is an n-channel MOSFET. The second DC voltage is +3.3 volts.

In use, when the user gets close to the electronic device which is in a sleep mode, the detector 110 detects a temperature change caused by the user. The detector 110 converts the temperature change to a weak voltage signal and amplifies the voltage signal for the first time. The non-inverting input terminal of the amplifier 210 receives the amplified voltage signal and amplifies the voltage signal for the second time. The gate of the MOSFET Q receives the voltage signal that is amplified for the second time. The MOSFET Q turns on. The drain of the MOSFET Q outputs a low voltage level wake up signal to the wake up terminal of the south bridge chip 400. The south bridge chip 400 wakes up the electronic device.

In one embodiment, an amplification factor of the amplifier 210 and a turn-on voltage of the MOSFET Q can be adjusted as required. In that case, the MOSFET Q is turned on when the user gets physically closer than a predetermined distance to the electronic device. The MOSFET Q outputs the low voltage level wake up signal to the south bridge chip 400. The south bridge chip 400 wakes up the electronic device.

The embodiments shown and described above are only examples. Many details are often found in the art such as the other features of a wake up system for electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wake up system for electronic device, the wake up system comprising:
   a detecting circuit configured to detect an ambient temperature change, convert the temperature change to a weak voltage signal, and amplify the voltage signal for the first time;
   an amplifier circuit configured to receive the amplified voltage signal and amplify the voltage signal for the second time;
   a switch circuit configured to receive the voltage signal that is amplified for the second time, and output a wake up signal when the voltage signal amplified for the second time is greater than a turning on voltage; and
   a south bridge chip configured to receive the wake up signal, and wake up the electronic device in accordance;
   wherein the detecting circuit comprises a detector and a first resistor; the detector comprises a gate, a source, and a drain; the gate of the detector is grounded; the source of the detector is grounded; and the drain of the detector receives a first DC voltage via the first resistor.

2. The wake up system for electronic device of claim 1, wherein the detecting circuit further comprises a second resistor and a capacitor; the source of the detector is grounded via the second resistor; and the drain of the detector is grounded via the capacitor.

3. The wake up system for electronic device of claim 2, wherein the detector is a heat detector; and the first DC voltage is +5 volts.

4. The wake up system for electronic device of claim 2, wherein the amplifier circuit comprises an amplifier, a third resistor, a fourth resistor, and a fifth resistor; the amplifier comprises an inverting input terminal, a non-inverting input terminal, an output terminal, and a power terminal; the non-inverting input terminal of the amplifier is electrically coupled to the source of the detector via the third resistor; the inverting input terminal of the amplifier is grounded via the fourth resistor; the inverting input terminal of the amplifier is electrically coupled to the output terminal of the amplifier via the fifth resistor; and the power terminal of the amplifier receives the first DC voltage.

5. The wake up system for electronic device of claim 4, wherein the switch circuit comprises a MOSFET, a sixth resistor, and a seventh resistor; the MOSFET Q comprises a gate, a source, and a drain; the gate of the MOSFET is electrically coupled to the output terminal of the amplifier; the source of the MOSFET is grounded; the drain of the MOSFET is electrically coupled to a wake up terminal of the south bridge chip via the sixth resistor; and the wake up terminal of the south bridge chip receives a second DC voltage via the seventh resistor.

6. The wake up system for electronic device of claim 5, wherein the MOSFET is a n-channel MOSFET; and the second DC voltage is +3.3 volts.

7. The wake up system for electronic device of claim 5, wherein the gate of the MOSFET receives the voltage signal that is amplified for the second time; the MOSFET turns on; the drain of the MOSFET outputs the wake up signal to the wake up terminal of the south bridge chip; the south bridge chip wakes up the electronic device.

8. The wake up system for electronic device of claim 7, wherein the wake up signal is a low voltage level wake up signal.

9. The wake up system for electronic device of claim 7, wherein an amplified factor the amplifier and the turning on voltage of the MOSFET can be adjusted as required; the MOSFET just turns on when the voltage signal amplified for the second time is greater than the turning on voltage.

10. A wake up system for electronic device, the wake up system comprising:
    a detecting circuit configured to detect an ambient temperature change, convert the temperature change to a weak voltage signal, and amplify the voltage signal for the first time;
    an amplifier circuit configured to receive the amplified voltage signal and amplify the voltage signal for the second time; and
    a switch circuit comprising a MOSFET;
    wherein the MOSFET comprises a gate, a source, and a drain; the gate of the MOSFET receives the voltage signal that is amplified for the second time; the MOSFET turns on when the voltage signal amplified for the second time is greater than a turning on voltage; the drain of the MOSFET outputs a wake up signal;
    a south bridge chip configured to receive the wake up signal, and wake up the electronic device in accordance; and
    wherein the detecting circuit comprises a detector and a first resistor; the detector comprises a gate, a source, and a drain; the gate of the detector is grounded; the source of the detector is grounded; and the drain of the detector receives a first DC voltage via the first resistor.

11. The wake up system for electronic device of claim 10, wherein the detecting circuit further comprises a second resistor and a capacitor; the source of the detector is grounded via the second resistor; and the drain of the detector is grounded via the capacitor.

12. The wake up system for electronic device of claim 11, wherein the detector is a heat detector; and the first DC voltage is +5 volts.

13. The wake up system for electronic device of claim 11, wherein the amplifier circuit comprises an amplifier, a third resistor, a fourth resistor, and a fifth resistor; the amplifier comprises an inverting input terminal, a non-inverting input terminal, an output terminal, and a power terminal; the non-inverting input terminal of the amplifier is electrically coupled to the source of the detector via the third resistor; the inverting input terminal of the amplifier is grounded via the fourth resistor; the inverting input terminal of the amplifier is electrically coupled to the output terminal of the amplifier via the fifth resistor; and the power terminal of the amplifier receives the first DC voltage.

14. The wake up system for electronic device of claim 13, wherein the switch circuit further comprises a sixth resistor and a seventh resistor; the MOSFET comprises a gate, a source, and a drain; the gate of the MOSFET is electrically coupled to the output terminal of the amplifier; the source of the MOSFET is grounded; the drain of the MOSFET is electrically coupled to a wake up terminal of the south bridge chip via the sixth resistor; and the wake up terminal of the south bridge chip receives a second DC voltage via the seventh resistor.

15. The wake up system for electronic device of claim 14, wherein the MOSFET is a n-channel MOSFET; and the second DC voltage is +3.3 volts.

16. The wake up system for electronic device of claim 14, wherein an amplified factor the amplifier and the turning on voltage of the MOSFET can be adjusted as required; the MOSFET just turns on when the voltage signal amplified for the second time is greater than the turning on voltage.

\* \* \* \* \*